United States Patent
Hemanthkumar et al.

(10) Patent No.: US 7,809,537 B2
(45) Date of Patent: Oct. 5, 2010

(54) GENERALIZED WELL MANAGEMENT IN PARALLEL RESERVOIR SIMULATION

(75) Inventors: Kesavalu Hemanthkumar, Dhahran (SA); Henry H. Hoy, Dhahran (SA); William Thomas Dreiman, Dhahran (SA); Usuf Middya, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 373 days.

(21) Appl. No.: 10/966,971

(22) Filed: Oct. 15, 2004

(65) Prior Publication Data

US 2006/0085174 A1   Apr. 20, 2006

(51) Int. Cl.
| G06G 7/50 | (2006.01) |
| G06G 7/48 | (2006.01) |
| G06G 7/62 | (2006.01) |
| G06G 7/66 | (2006.01) |
| G05B 13/02 | (2006.01) |
| G05B 13/04 | (2006.01) |

(52) U.S. Cl. .............................. 703/10; 703/9; 700/28; 700/32

(58) Field of Classification Search .............. 703/9–10; 700/28, 32
See application file for complete search history.

(56) References Cited

U.S. PATENT DOCUMENTS

| 4,442,710 | A | 4/1984 | Meng |
| 6,282,452 | B1 | 8/2001 | Deguzman et al. |
| 6,980,940 | B1* | 12/2005 | Gurpinar et al. .............. 703/10 |
| 6,982,399 | B1* | 1/2006 | Hunts .......................... 219/400 |
| 2002/0049575 | A1 | 4/2002 | Jalali et al. |
| 2002/0165671 | A1* | 11/2002 | Middya ....................... 702/12 |
| 2003/0225522 | A1 | 12/2003 | Poe |
| 2005/0267718 | A1* | 12/2005 | Guyaguler et al. ............ 703/10 |

FOREIGN PATENT DOCUMENTS

EP   0881357   12/1998

OTHER PUBLICATIONS

Yeten et al. "Optimization of Nonconventional Well Type, Location and Trajectory", Society of Petroleum Engineers, Sep. 29, 2002-Oct. 2, 2002, SPE 77565, pp. 1-14.*

Stackel et al. "An Example Approach to Predictive Well Management in Reservoir Simulation", Journal of Petroleum Technology, pp. 1087-1094, Jun. 1981.*

Total Well Management Aids Production of Beam Pumped Wells, Petrokeum Engineer International, Oct. 1, 1995, pp. 27, 29, 31-32, 34, vol. 68, No. 10, Hart Publication, US.

(Continued)

*Primary Examiner*—Kamini S Shah
*Assistant Examiner*—Suzanne Lo
(74) *Attorney, Agent, or Firm*—Bracewell & Giuliani LLP

(57) ABSTRACT

A computer-implemented process simulates production of oil and gas from hydrocarbon reservoirs. The process is used to help forecast the optimal future oil and gas recovery from large hydrocarbon reservoirs. At the same, this process is flexible to allow for further addition of new options; robust and reliable; and easy to use. The process is also comprehensive in that it allows a forecast of future performance of a wide range of reservoirs and future operation scenarios. By using the high-resolution models provided, a reservoir can be described much more accurately.

16 Claims, 13 Drawing Sheets

OTHER PUBLICATIONS

Kaifeng, Yao, et al., Hydrocarbon Reservoir Predicition Using Support Vector Machines, Advances in Neural Networks, International Symposium on Neural Networks Proceedings, Aug. 2004, pp. 537-542, vol. 1, Springer-Verlag Berlin, Germany.

Stackel, A.W., et al "An Example Approach to Predictive Well Management in Reservoir Simulation," Journal of Petroleum Technology, pp. 1087-1094, Jun. 1981.

Wijesinghe, A.M. et al.: "A Comprehensive Well Management Program for Black Oil Reservoir Simulation," SPE 12260,1983 SPE Symposium on Reservoir Simulation, San Francisco, Nov.

Mohamed, D.A. et al "An Efficient Reservoir-Coupled Gas Gathering System Simulator," SPE 8333, 1979 SPE Annual Technical Conf and Exh, Las Vegas, Sep. 23-26.

Mrosovsky, I., Wong, J.Y., and Lampe, H.W.: Construction of a Large Field Simulator on a Vector Computer, Journal of Petroleum Technology, pp. 2253-2264, Dec. 1980.

Dogru, A.H., et al, "A Massively Parallel Reservoir Simulator for Large Scale Reservoir Simulation," SPE 51886,1999 SPE Reservoir Simulation Symposium, Houston TX, Feb. 1999.

Dogru, A.H., Dreiman, et al, "Simulation of Super K Behavior in Ghawar by a Multi-Million Cell Parallel Simulator," SPE 68066, Middle East Oil Show, Bahrain Mar. 2001.

Yeten, Burak, et al., Optimization of Nonconventional Well Type, Location and Trajectory, SPE 77585, 2002, 1-14.

Horn, M.K., "Relationship between Giant Field Data and Ultimate Recoverable Oil", (a modified version of a two-part article), Oil and Gas Journal, Apr. 2 and Apr. 8, 2007.

Fitzgerald, T.A., "Giant Field Discoveries 1968-1978: An Overview", Giant Oil and Gas Fields of the Decade 1968-1978, pp. 1-5, 64th Annual Meeting of the American Association of Petroleum Geologists in Houston, TX, 1979.

Halbouty, Michel, T., "Chapter 1, Introduction", Giant Oil and Gas Fields of the Decade 1978-1988, pp. 1-2, Stavanger, Norway Conference, 1990.

Halbouty, Michel, T., et al., "Geology of Giant Petroleum Fields", World's Giant Oil and Gas Fields, Geological Factors Affecting Their Formation, and Basic Classification [Part 1], pp. 502-528, 1968 Annual Meeting of the Association in Oklahoma City.

Klett, T. R., et al., "Reserve Growth of the World's Giant Oil Fields", Giant Oil and Gas Fields of the Decade 1990-1999, Chapter 3, pp. 107-122, 2003.

Halbouty, Michel, T., "Giant Oil and Gas Fields of the 1990s: An Introduction", Giant Oil and Gas Fields of the Decade 1990-1999, Chapter 1, pp. 1-13, 2003.

M. Ray Thomasson, "Rockies Region Dominates US in Giant Field Discoveries", Houston Geological Bulletin on Line, Jun. 3, 2003, http://www.mines.edu/academic/geology/newstuff/rockymtngiants.html.

"SOCAL finds 'Giant' Field", Reuters, Oct. 22, 1982, http://query.nytimes.com/gst/fullpage.html.

Smith, Julia Cauble, "Panhandle Field", The Handbook of Texas Online, Jan. 2003, http://www.tshaonline.org/handbook/online/articles/PP/dop1_cite.html.

Wenner, Melinda, "Study: 'Peak Oil' Will Be Reached by 2018", Apr. 2007, http://www.foxnews.com/story/0,2933,266764,00.html.

Elliott, Steve, et al., "The Giant Karachaganak Field, Unlocking Its Potential", Oilfield Review, Autumn 1998, pp. 16-25.

Appenzeller, Tim, "The End of Cheap Oil", National Geographic.com, Jun. 2004, http://ngm.nationalgeographic.com/ngm/0406/feature5.

Austin, Diane, et al., "History of the Offshore Oil and Gas Industry in Southern Louisiana", Interim Report, vol. 1, Papers on the Evolving Offshore Industry, OCS Study MMS 2004-049, U.S. Department of the Interior, Minerals Management Service, Gulf of Mexico OCS Region, New Orleans, Jul. 2004, pp. 33 and 49, http://www.gomr.mms.gov.

Mann, Paul, et al., "Tectonic Setting of the World's Giant Oil Fields" Part 1, WORLDOIL.COM, Sep. 2001, vol. 222, No. 9, http://www.worldoil.com/magazine/magazine_link.asp.

Mann, Paul, et al., "Tectonic Setting of the World's Giant Oil Fields" Part 2, WORLDOIL.COM, Oct. 2001, vol. 222, No. 10, http://www.worldoil.com/magazine/magazine_link.asp.

Mann, Paul, et al., "Tectonic Setting of the World's Giant Oil Fields" Part 3, WORLDOIL.COM, Nov. 2001, vol. 222, No. 11, http://www.worldoil.com/magazine/magazine_link.asp.

Wallace, D. J., et al., "A Reservoir Simulation Model With Platform Productive/Injection Constraints for Development Planning of Volatile Oil Reservoirs", SPE 12261, pp. 285-291 (Figures attached), Reservoir Simulation Symposium, San Francisco, CA, Nov. 15-18, 1983.

* cited by examiner

GENERALIZED WELL MANAGEMENT IN PARALLEL RESERVOIR SIMULATION

BACKGROUND OF THE INVENTION

1. Field of the Invention

The present invention herein relates to computer-implemented simulation of production of oil and gas from hydrocarbon reservoirs.

2. Description of the Related Art

In recent years, a reservoir simulator with massive parallel processing capabilities for large scale reservoir simulation was developed by the assignee of the present application. The reservoir simulator was known as the POWERS simulator and was described in the literature. See, for example articles by Dogru, A. H., et al, "A Massively Parallel Reservoir Simulator for Large Scale Reservoir Simulation," Paper SPE 51886 presented at the 1999 SPE Reservoir Simulation Symposium, Houston Tex., February 1999 and by Dogru, A. H., Dreiman, W. T., Hemanthkumar, K. and Fung, L. S., "Simulation of Super K Behavior in Ghawar by a Multi-Million Cell Parallel Simulator," Paper SPE 68066 presented at the Middle East Oil Show, Bahrain, March 2001.

In giant hydrocarbon reservoirs where there could be thousands of wells and hundreds of well groups and tens of thousands of well completions, reservoir simulators were called once every time step during the simulation run. There were often many different computational paths that had to be taken at every time step depending on the state of the reservoir and deliverability requirements. Further, these computational paths potentially were different at every time step.

When there were a large number of well groups with inter-relationships between them, the computations became even more complex and time-consuming, and the well management portion for completed wells would often dominate the entire simulation. That is, the members of a well group were themselves other well groups. There could be six or more levels of nesting within well groups. In addition well groups could be locally linked. For example, water produced from a group of production wells could be linked to a group of water disposal wells by using the water recycle option.

Reservoir simulation software with prediction well management has been available for the last two decades. However, due to the computational complexity, the use of such software has been restricted to small and medium sized oil reservoirs with a limited number of wells. If these methods were attempted to be applied to giant reservoirs with millions of grid cells, the turnaround time for a simulation run became impractical. The run times for a single simulation would have been in the order of weeks or months. In many cases, a simulation run was not even possible due to computer memory limitations. Thus, in the past, only sections of the giant reservoirs have been modeled, and this was done using very coarse descriptions (less than 500,000 or so grid cells). The simulation models have not been able to track bypassed oil areas. The resultant models of reservoirs have thus not really been predictive or accurate.

SUMMARY OF THE INVENTION

Briefly, the present invention provides a computer-implemented method of analyzing performance of a hydrocarbon reservoir for prediction of future production of hydrocarbon fluids from wells in the reservoir. A set of production rules are established for an object in the formation. With the present invention, an object may be a well, a number of completions in a well, or a group of wells in the reservoir. Performance data are then processed in the computer for the object at a specified time to determine simulated production results. The simulated production results so determined are then compared in the computer with the established set of production rules. Any production results for an object which violate at least one of the established set of production rules are then identified so that corrective action for that object may be taken.

The techniques of the present invention provide help in forecasting the optimal future oil and gas recovery from some of the largest hydrocarbon reservoirs in the world. At the same time, this method of the present invention is flexible, in that it allows for further addition of new options. The present invention is also robust (or reliable) and easy to use (or user friendly). The present invention is, however, also comprehensive in that it allows users to forecast the future performance of a wide range of reservoirs and future operation scenarios. By using high resolution models, a reservoir is described much more accurately with the present invention.

This subject matter of the present invention uses a computationally efficient, generalized, constraints-based approach that is specifically tailored for very large reservoirs. The generalized constraint equations are efficient and compact in that all possible constraints are considered at all times. The present invention thus does not require extensive software code branching that would be required in prior art well management techniques.

The generalized constraint equations are used at the reservoir, group, well and completion levels. Once the constraint equations are solved and the violations are identified at each level (for example, at the group level), appropriate remedial actions are taken at that level. This process is continued until all constraints for the entire reservoir have been checked and violations, if any, are acted upon.

The present invention also provides a data processor which performs the processing steps according to the present invention and provides an analyst with output displays of the processing results for analyzing performance of hydrocarbon reservoir for future production from wells in the reservoir. The present invention further provides a computer program product in the form of machine-readable instructions for causing the processor to perform the processing steps according to the present invention.

BRIEF DESCRIPTION OF THE DRAWINGS

A better understanding of the present invention can be obtained when the detailed description set forth below is reviewed in conjunction with the accompanying drawings, in which.

Figure 1:
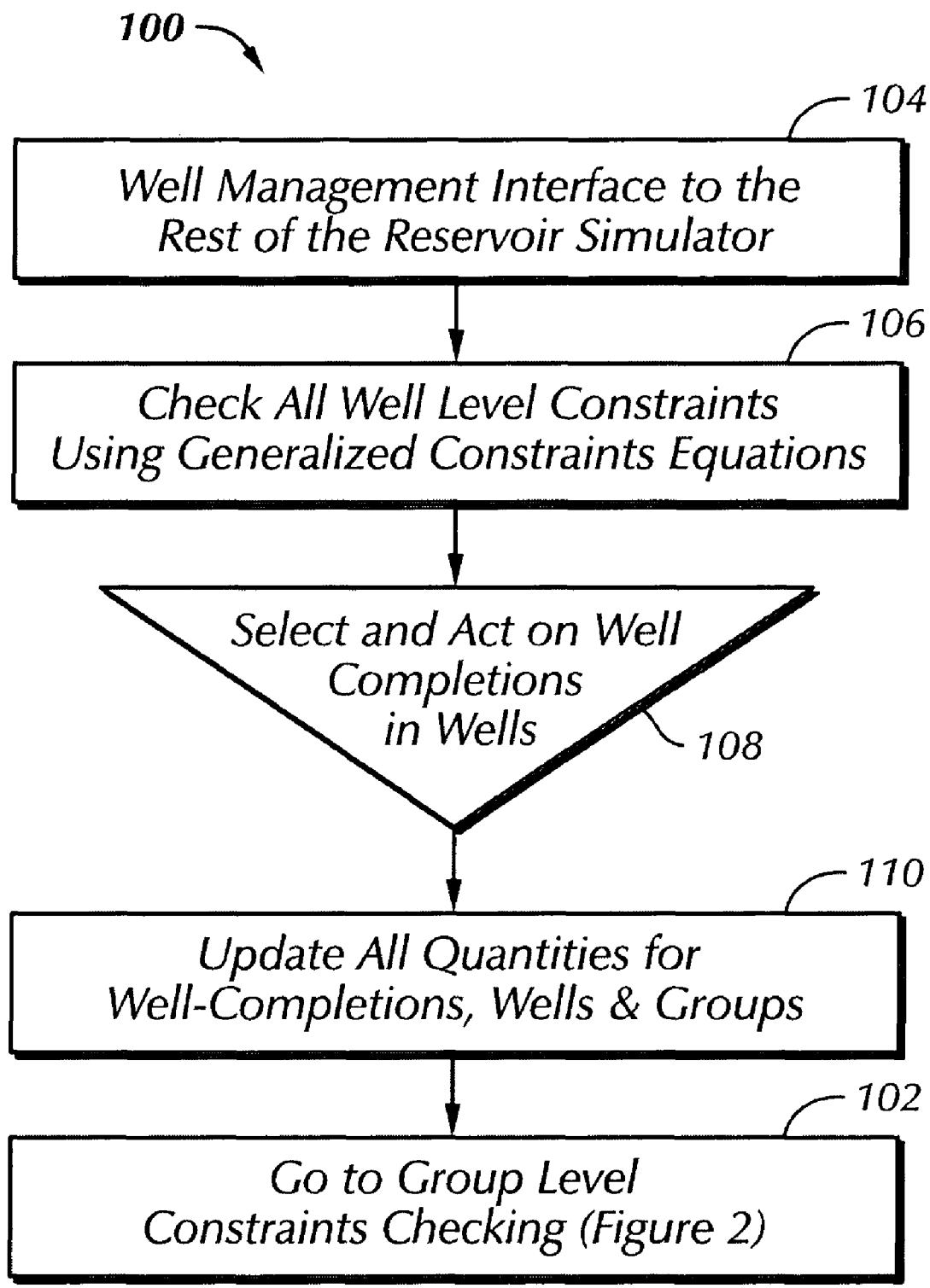
FIGS. 1 and 2 are functional block diagrams of processing steps for analyzing performance of a hydrocarbon reservoir for well management according to the present invention.

To better understand the invention, we shall carry out the detailed description of some of the modalities of the same, shown in the drawings with illustrative but not limited purposes, attached to the description herein.

DETAILED DESCRIPTION OF THE PREFERRED EMBODIMENTS

As illustrated in FIG. 1, a sequence of processing steps is indicated for analyzing performance of a hydrocarbon reservoir according to the present invention. The process of the present invention thus provides generalized well management for a well, a number of completions in a well, a group of suitable size in a reservoir, usually in some way interrelated, of wells or for the entirety of wells in the reservoir.

The present invention operates on time dependent sets of 'rules' (constraints) and takes specified 'actions' (e.g. drill new wells) on groups of wells (or individual wells or well completions). There are no limits as to the number of rules, actions, groups and wells. Throughout the rest of this document the word 'group(s)' implies a collection of individual wells.

In the sequence of FIG. 1, a flow chart 100 indicates a first or well calculation sequence of the basic computer processing sequence of the present invention and the computations and data processing operations during a typical embodiment of the present invention. A flow chart 102 (FIG. 2) represents a second or group level calculation sequence portion of the computer processing sequence according to the present invention.

In the flow chart 100, a first step 104 represents a transfer or interface between the process of the present invention and the process of the massively parallel reservoir simulator processing sequence of the POWERS described above. Step 106 represents the next step when well level constraints are checked using generalized constraint equations for wells or completions in wells, as will be described below.

Figure 2:
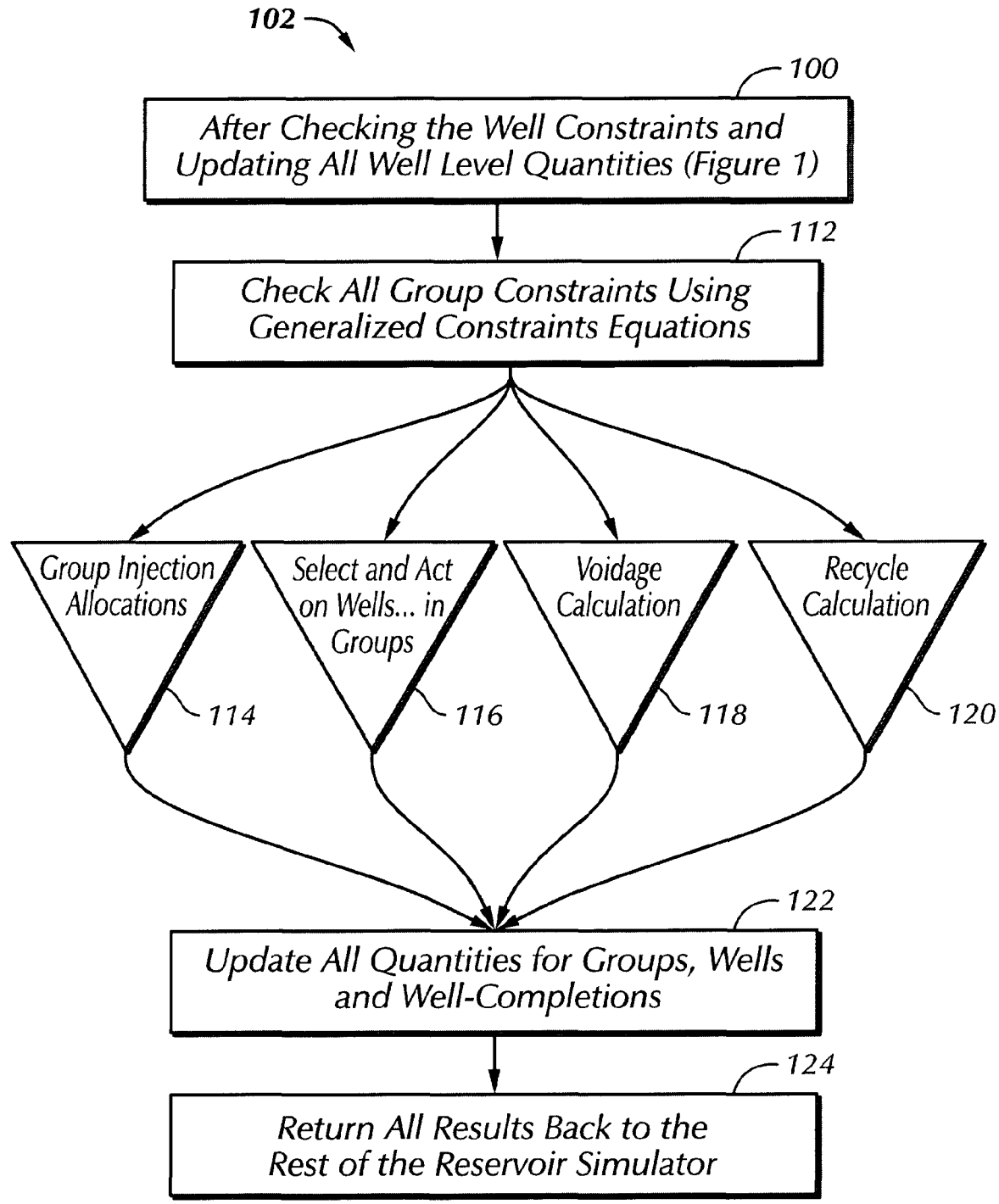

During a next step shown schematically at 108, the data are analyzed for those well completions in the wells. Where indicated, data representing indicated future completions in wells are selected, and indicated as having been made. Next, during step 110 the computed quantities are updated for well completions in wells, as well as for wells of interest. Thereafter, a transfer or interface is made form the steps of flow chart 100 to those of flow chart 102 (FIG. 2).

In the flow chart 102, a step 112 represents the group constraints are checked for a number of wells which are interrelated as a well group, or otherwise linked, according to the production constraints using generalized constraint equations. If desired, the entire reservoir may be regarded as one group of wells and data processed accordingly. Steps 114, 116, 118 and 120 are then available after step 112 where the data from step 112 are analyzed with the established production rules, and for those groups of wells which violate at least one of the production rules, protective action may be taken. Steps 114, 116 118 and 120 represent those calculations and corrective actions. For example, group injection allocations may be modified as indicated at step 114. Also, during step 116 data are analyzed for wells in associated, linked or interrelated groups of wells. Where indicated, data representing indicated future completions in those groups of wells are selected and indicated as having been made. During step 118, as indicated, voidage calculations as applicable are made for the group of wells. Similarly, as indicated during step 120, recycle calculations as applicable are made for the groups of wells.

During step 122, the computed quantities are updated for the groups of wells in the reservoir of interest. As indicated, the groups may include treating the entire reservoir or in effect a group. Thereafter, a transfer or interface is made from the steps of the flow chart 102 to the POWERS processing software described above.

The present invention overcomes difficulties of previous reservoir simulation software with prediction well management. The present invention uses generalized constraint equations to solve for the constraints that are violated. The generalized constraint equations are efficient and compact in that all possible constraints are considered at all times. Hence the present invention does not require extensive software code branching that would be required in a prior art well management code. The generalized constraint equations are used at the reservoir, group, well and completion levels. Once the constraint equations are solved and the violations are identified at each level (for example, at the group level), appropriate remedial actions are taken at that level. This process is continued until all constraints for the entire reservoir have been checked and violations if any are acted upon.

The generalized constraint equation is presented below:

$$\sum_{i=1}^{n} w_{ij} * q_{ki} \leq \pm Q_{jk}, j = 1, m; k = 1, l \quad (1)$$

Where
q=stream quantity
w=weight
Q=constraint value
i=1 to n stream quantities
j=1 to m constraint equations per object
k=1 to l objects, for example groups, wells, completions If the constraint is a ratio of stream quantities, then the right hand side of Equation (1) will be zero and w will be −1 times the constraint value for the stream that is in the denominator of the ratio constraint. Typically, if there are m constraints per object and there are l objects, then there will be m times l equations to be solved at every time step. By casting the constraint equation in the above form, an additional advantage is that all types of constraints are naturally scaled. That is, the terms in Equation (1) are all rate quantities regardless of the type of constraint.

The problem of nested group of wells is solved by associating a pointer to all the wells that belong to a super group from the sub-group wells. This eliminates the requirement of keeping track of the interrelationships between groups while being completely cognizant of these interrelationships through the wells. Flexibility is given by allowing the specification of a well in more than one group and thus allowing for the local linking of groups for any phase (gas, water, oil, NGL) recycling and voidage replacement.

Figure 13:
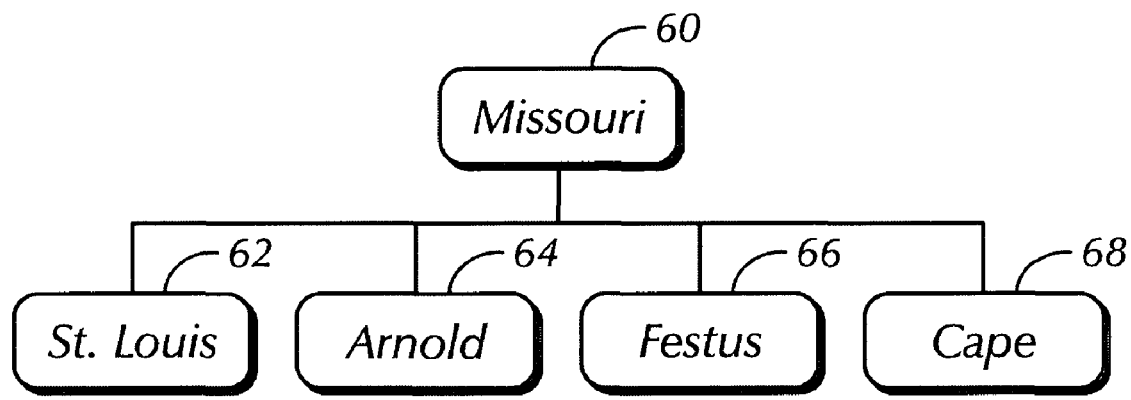
FIGS. 13, 14, 15, 16, 17, 18, 19 and 20 are schematic diagrams which illustrate by example, the relationships between field, sub-fields, major operating areas, group and well levels of a hypothetical reservoir.
Figure 14:
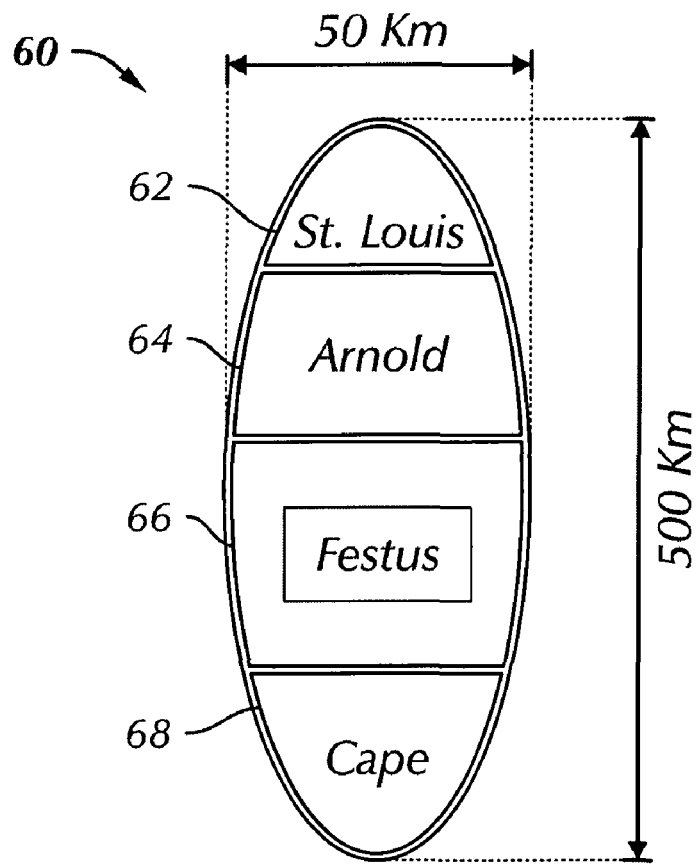

To help illustrate the complexity in the handling of nested groups of wells a hypothetical giant oil field 60 (FIG. 13) is used, identified Missouri as an example. This field 60 has four major identified sub-fields 62, 64, 66 and 68, designated Louis, Arnold, Festus and Cape, respectively. FIG. 13 shows the major field hierarchy and FIG. 14 shows the map of the hypothetical Missouri Field 60 (level 1 nesting) with the location of the major sub-fields 62, 64, 66 and 68 (level 2 nesting). The giant Missouri field 60 is 500 Km long and 50

Km wide, as indicated schematically in FIG. 14. For the purpose of demonstrating the nesting of groups of wells, a simplified version can be considered of the major sub-field 66, Festus. The major sub-field 66 or Festus has two major operating areas 70 and 72, designated Jef and Crystal (level 3 nesting), respectively.

Figure 15:
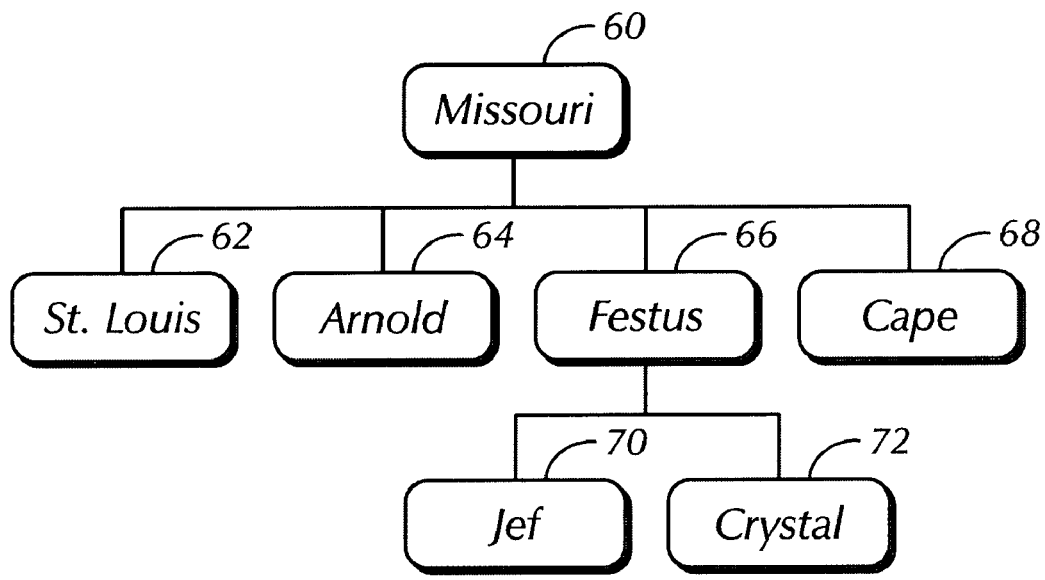
Figure 16:
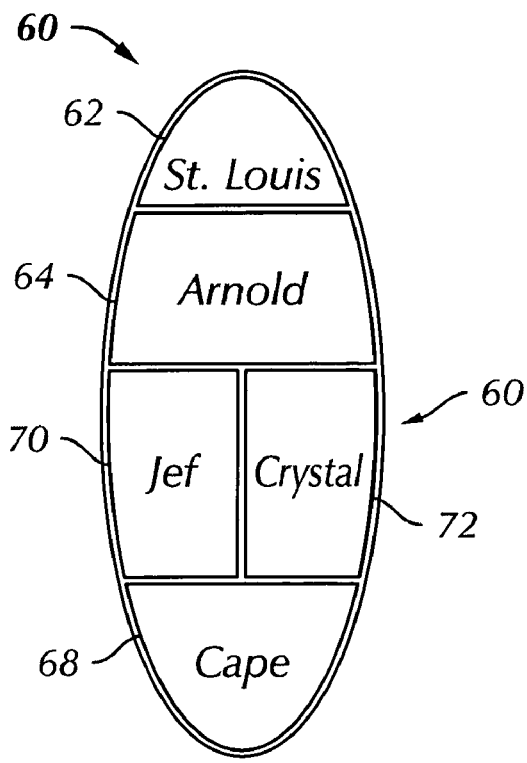
Figure 17:
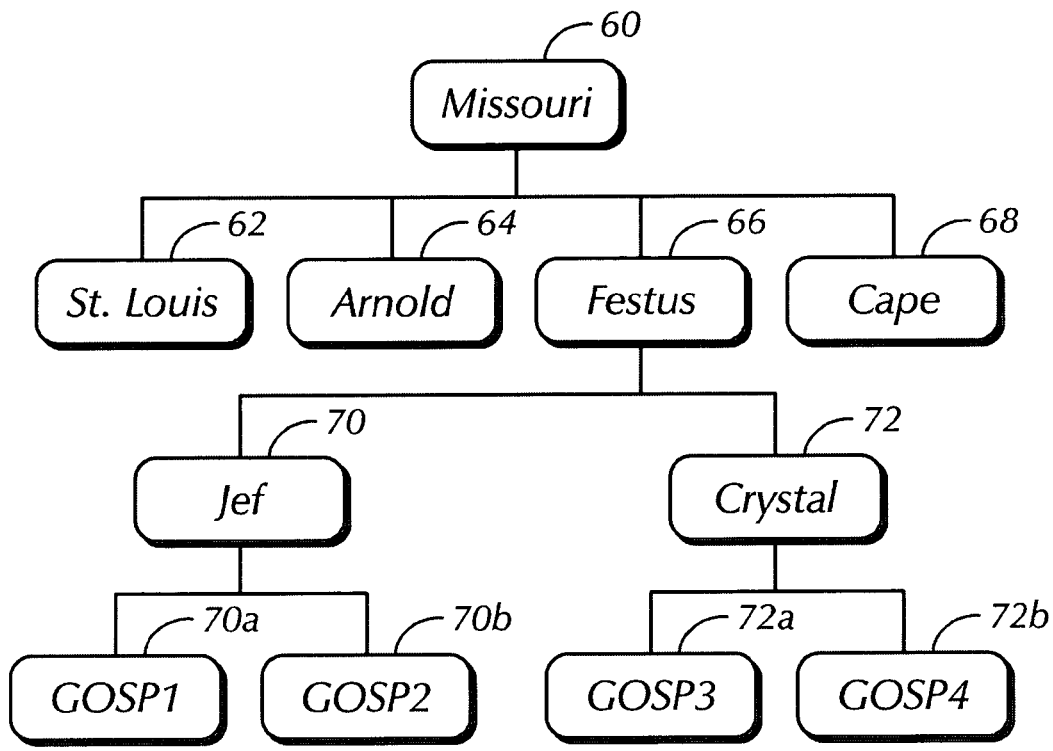
Figure 18:
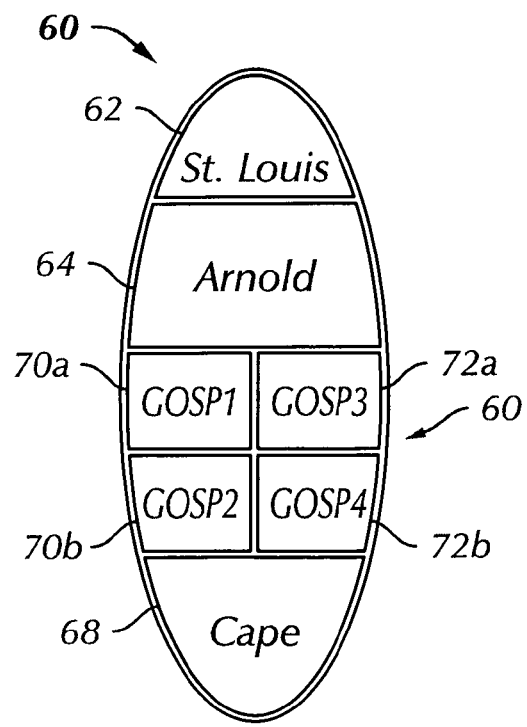
Figure 19:
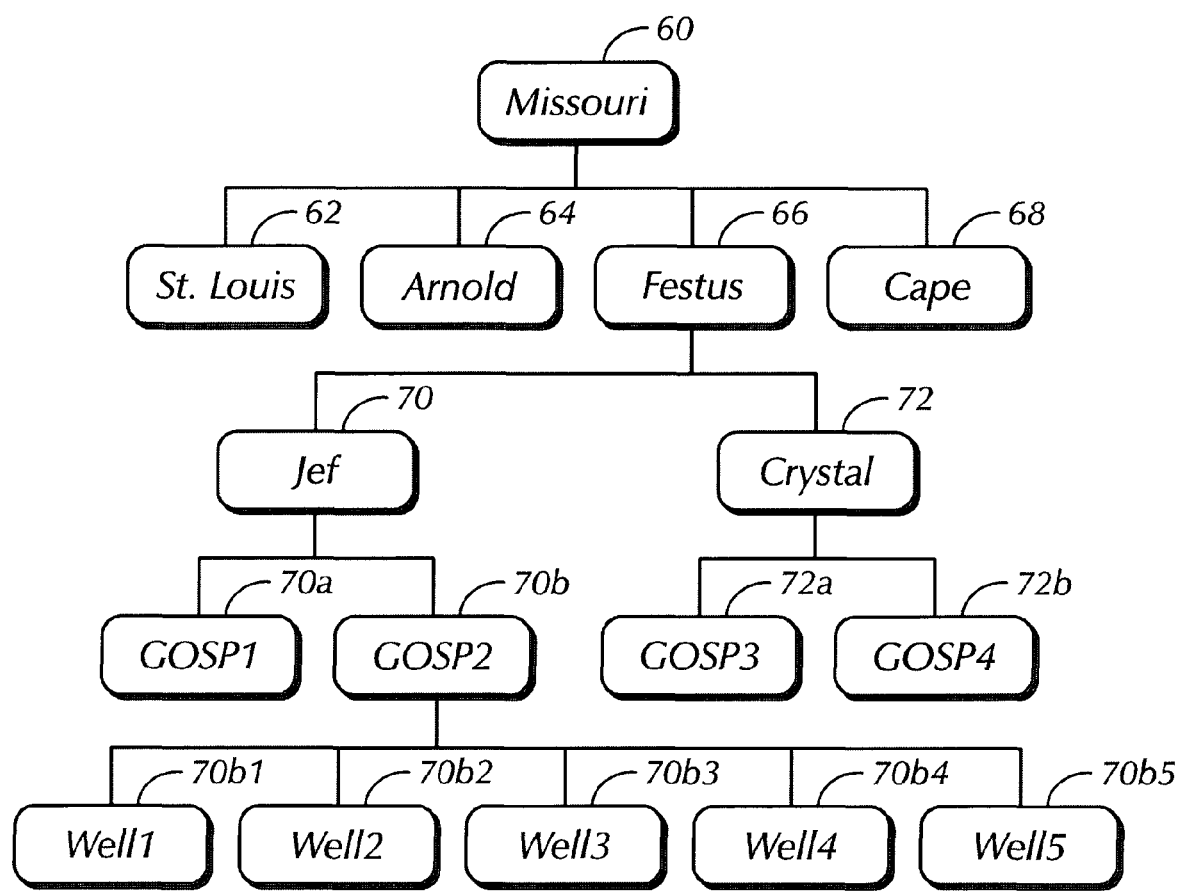
Figure 20:
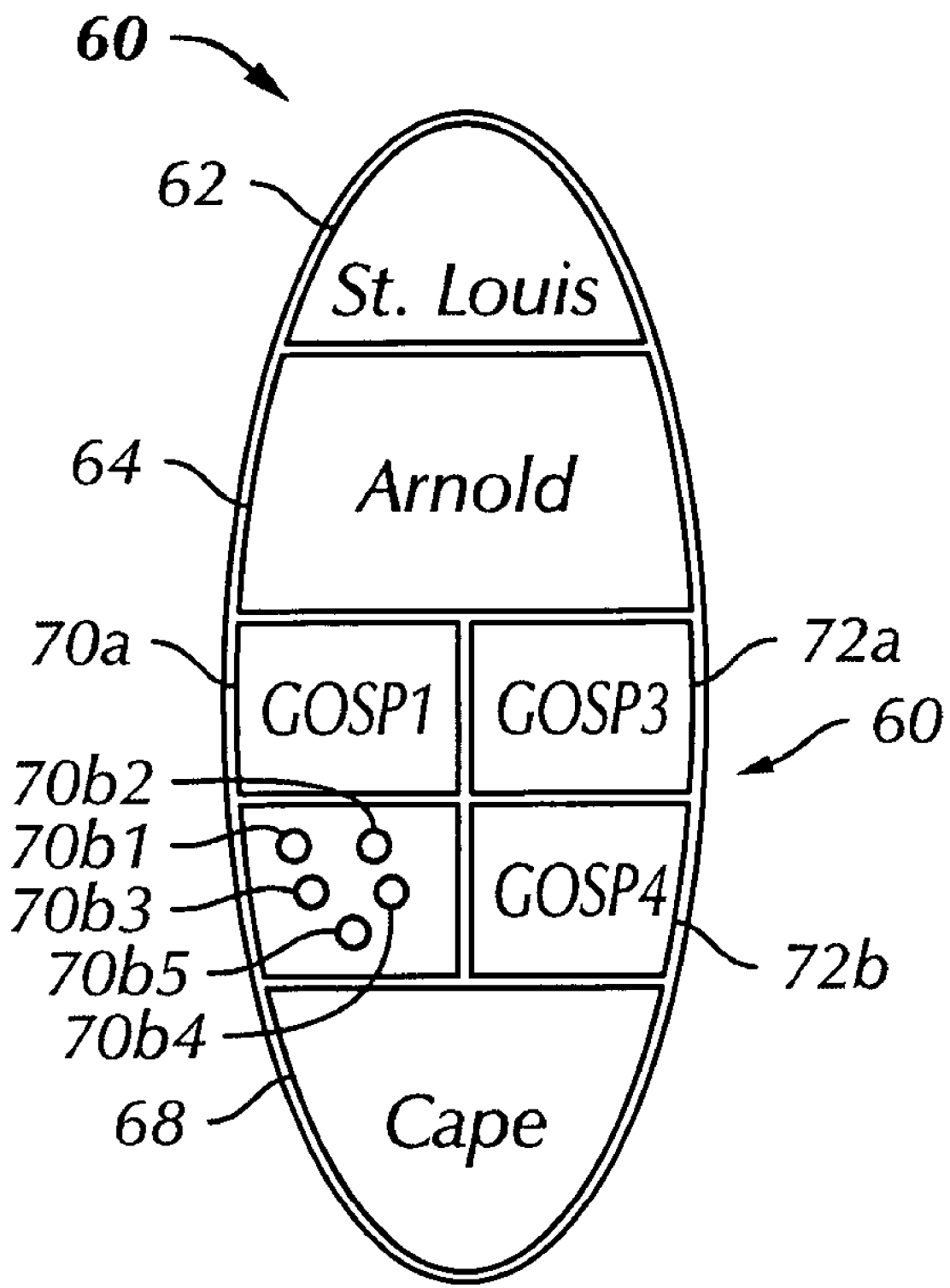

FIG. 15 shows the third level nesting of well groups with the two operating areas, Jef and Crystal in sub-field 66, and a map corresponding to the location of the operating areas 70 and 72 is shown in FIG. 16. The fourth level nesting of well groups is shown in FIG. 17 with the corresponding location in the field in FIG. 18. The operating areas 70 and 72 or Jef and Crystal, respectively, have two GOSP's or Gas Oil Separation Plants each. Operating area 70 (or Jef) has a GOSP1 identified as 70a and a GOSP2 identified as 70b; operating area 72 or Crystal has GOSP3 identified as 72a and a GOSP4 identified as 72b. FIG. 19 shows the fifth level of nesting with a set of five wells identified as 70b1, 70b2, 70b3, 70b4 and 70b5, respectively in GOSP2 70b of operating area 72, Jef. The corresponding location of these wells in the field is shown schematically in FIG. 20.

The process of the present invention keeps track of all different grouping levels by associating a pointer to each of the wells that belong to a super group, in this case Missouri or 60, from the sub-fields, Louis 62, Arnold 64, Festus 66 and Cape 68 wells. The sub-field Festus 66 in turn keeps track of wells in operating areas, Jef 70 and Crystal 72. The operating area Jef 70, in turn keeps track of wells in GOSP1 or 70a and GOSP2 or 70b. Finally GOSP2 70b is connected to the five wells 70b1, 70b2, 70b3, 70b4 and 70b5. This eliminates the requirement of keeping track of the inter-relationships between groups while being completely cognizant of these inter-relationships through the wells. This approach as illustrated hypothetically above makes the processing of the nesting of the groups and wells very efficient and simple. In a real field example, there could be tens of operating areas, hundreds of GOSPs (well groups) and thousands of wells.

Examples of stream quantities are oil, gas, water, liquid (oil+water), NGL (natural gas liquids) rates or potential oil, gas, water rates, etc. In Equation (1), $Q_{jk}$ is an input constraint value for constraint j, say for example, an oil production target of 300,000 barrels/day for object k, say for example a group of wells. The quantity $q_{ki}$ is a dynamically calculated rate of stream i for object k which in this example could be the production from a group of wells that are processed by a Gas Oil Separation Plant (GOSP), say GOSP A. The variable $w_{ij}$ is the weight for stream i for constraint j. For this very rudimentary example, this above process can be illustrated for the following simple situation.

A GOSP (Gas Oil Separation Plant) production target is 300,000 BPD (barrels per day) of oil and MP (maintain-potential) target is 360,000 BPD of oil and a prioritized list of MP-wells are available for drilling if needed. Also the GOSP water-cut (a measure of the water handling capacity) should not exceed 30 percent and if it did, then wells with a water-cut above 30 percent are worked over until no completion produces more than 20 percent water; and the GOSP Gas-Oil Ratio (a measure of the gas processing capacity) should not exceed 1500 SCF/BBL (standard cubic feet per barrel) and if it did, then the high GOR (Gas-Oil Ratio) wells are to be shut in. At each time step (e.g. every month), all of the above constraints are checked and remedial actions are taken, if necessary, by the process of this invention in the reservoir simulator. If the potential oil rate were to fall below the 360,000 BPD of oil, MP-wells will be drilled according to the well-priority so that the target deliverability of 300,000 BPD is always maintained. Also, at any time, if water-cut and/or GOR limit is exceeded, appropriate action is taken.

Equation (1) reduces to:

$$\sum_{i=1}^{n} w_{ij} * q_{group,i} \leq \pm Q_{j,group} \quad (2)$$

Equation (2) can be further simplified as the constraint is an oil rate constraint which implies that $w_1$ is equal to 1 and all the other weights are 0 (assuming oil is the first stream). Hence all the terms in the summation 1 to n except the first term drop out.

$$q_{group,oil} \leq \pm Q_{oilrateconst.,group} \quad (3)$$

Now as another example it is assumed that 60 out of 200 wells in a field are to be processed by GOSP A and for simplicity each of these 50 wells is producing 7500 barrels/day of oil and that at a specified date, such as on Jun. 27, 2005, the remaining 10 of the 60 for GOSP A wells are new wells to be drilled (MP wells) if the potential oil rate were to go below 360,000 barrels/day. The left hand side of Equation (3) will sum to 375,000 barrels/day of oil. This violates the constraint (target production of 300,000 barrels/day of oil) and a remedial action is necessary.

It is assumed that the remedial action is to scale back based on a pre-defined well priority. The well priority is specified by reservoir management engineers and it is provided input data to the process of the invention to meet the target rate. In addition, the selection of these wells can be based on a criterion of high rate wells say, wells producing more than 2000 barrels/day of oil. Then the lowest priority wells of these high rate wells are scaled back or put on standby (temporarily shut-in) to meet the target rate.

For checking this constraint, Equation (1) takes the following form $$\sum_{i=1}^{n} w_i * (q_{well,i} * wg(\text{well}, gospA)) \leq \pm Q_{j,well}, \ldots \text{well} = 1, nwells \quad (4)$$

Where wg is the well-group matrix of ones or zeroes depending on whether the well belongs to the group or not and the summation is over all the wells in the reservoir model.

In Equation (4), the constraint $Q_{j,well}$ is the selection of the wells whose oil production rates are greater than 2000 barrels/day. Since the constraint is an oil rate constraint, Equation (4) simplifies to:

$$(q_{well,oil} * wg(\text{well},gospA)) \leq \pm Q_{oilrateconst.,well} \ldots$$
$$\text{wells} > 2000 \text{ bpd} \quad (5)$$

For checking the oil potential rate for GOSP A, Equation (1) is used as follows:

$$\sum_{i=1}^{n} w_{ij} * qpot_{group,i} \leq \pm Q_{j,group} \quad (6)$$

Equation (6) can be further simplified as the constraint is a potential oil rate constraint which implies that $w_1$ is equal to 1 and all the other weights are 0 (assuming oil is the first stream). Hence all the terms in the summation 1 to n except the first term drop out.

$$qpot_{group,oil} \leq \pm Q_{potoilrateconst,group} \quad (7)$$

In Equations (6) and (7), qpot is the dynamically calculated potential stream rate for the group (GOSP A) in question and $Q_{j,group}$ in Equation 6 is the potential oil rate constraint. As discussed earlier, the potential oil rate for GOSP A is 375,000 barrels/day on Jun. 27, 2005. This rate is above the specified potential oil rate of 360,000 barrels/day and hence no remedial action is required at this time.

It is also helpful to consider a ratio constraint namely, the GOSP GOR should not exceed 1500 SCF/Barrel. As discussed earlier, for a ratio constraint the right hand side of Equation (1) is zero, and the stream rate in the denominator of the ratio constraint namely, oil rate, is multiplied by the constraint value, Q which in this case is the GOR of 1500 SCF/Barrel.

Thus Equation (1) reduces to:

$$Q_{GOR,group} w_1 q_{group,oil} + w_2 q_{group,gas} + w_3 q_{group,water} + \cdots \leq \pm 0 \quad (8)$$

The stream weights are −1 for oil and +1 for gas and the rest of the weights are zero. So equation 8 reduces to $$-Q_{GOR,group} q_{group,oil} + q_{group,gas} \leq \pm 0 \quad (9)$$

If the above constraint is violated (that is, if the GOSP GOR is greater than 1500 SCF/Barrel) then further applications of Equation (1) are required. For example, the wells with high GOR can be isolated by applying Equation (1) and then the high GOR completions in the high GOR wells can be isolated and shut in according to a specified criterion.

The remaining constraints specified for GOSP A are checked by applying Equation (1), and if required, remedial actions are taken. This process is continued for all the other groups, wells and completions based on the constraints specified for the field.

To illustrate the application of the present invention and show the interplay of time and its effect on the reservoir performance, and to exercise the well management computational process shown in FIGS. 1 and 2, a simple future performance forecast of a hypothetical AZIR field is presented.

The AZIR field was for this example assumed to have been discovered and placed into production in January, 1999. A detailed full field simulation model was built with no up scaling (averaging) of the geological model (this implies that the accuracy of the geological model is preserved) which contained 1.4 million grid cells.

Processing facilities in this example are to be designed to handle a GOR (Gas to Oil Ratio) of 1500 SCF/barrel. The plan is to produce this field at the rate of 300,000 barrels of oil per day starting from Jan. 1, 2005. To ensure this deliverability, the field will be operated at a potential production rate of 360,000 barrels/day. Whenever the potential production for the field goes below this rate, new wells are to be drilled to keep the field potential above 360,000 barrels/day.

By using in the process of the present invention in the reservoir simulator it is possible to find out how long the field target oil production rate of 300,000 barrels/day can be sustained, and how many new wells (MP wells) are needed to maintain this production plateau. Also, the field GOR should not exceed 1500 SCF/barrel.

In this hypothetical field, AZIR, the production from the wells are processed by six GOSPs (Gas Oil Separation Plants). Three GOSPs are situated on the East flank of the field from South to North and the other three GOSPs are situated on the West flank from South to North of the AZIR field. In general there is no limit to the number of GOSPs, wells, and completions that the process of the present invention can handle as mentioned earlier. Each GOSP in the AZIR field processes the production from about 70 wells. Of the 70 wells tied to each GOSP, about 10 are existing wells (producing wells from January 1999) and 60 are Maintain Potential (MP) wells to be drilled as and when necessary by the present invention to maintain the field potential production of 360,000 barrels of oil per day.

The above simulation problem was run in a mixed paradigm parallel mode on a PC cluster using 14 processors (the PC cluster has 128 Xeon 1.7 Ghz processors). As stated earlier, the present invention is implemented in conjunction with a mixed paradigm parallel (combination of shared memory parallel and massively parallel) reservoir simulator, such as the POWERS simulator described above.

In any case, the processor of the computer as shown at 50 receives the data concerning the field of interest to undertake the logic of the present invention, which may be executed by a processor as a series of computer-executable instructions. The instructions may be contained on a data storage device 52 with a computer readable medium, as shown, having a computer usable medium stored thereon. Or, the instructions may be stored in memory of the computer 50, or on magnetic tape, conventional hard disk drive, electronic read-only memory, optical storage device, or other appropriate data storage device. The results of the processing are then available on a display as shown at 54 or printer or any other form of output device.

The flow charts of FIGS. 1 and 2 herein illustrate the structure of the logic of the present invention as embodied in computer program software. Those skilled in the art will appreciate that the flow charts illustrate the structures of computer program code elements including logic circuits on an integrated circuit that function according to this invention. Manifestly, the invention is practiced in its essential embodiment by a machine component that renders the program code elements in a form that instructs a digital processing apparatus (that is, a computer) to perform a sequence of function steps corresponding to those shown.

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

Figure 3:
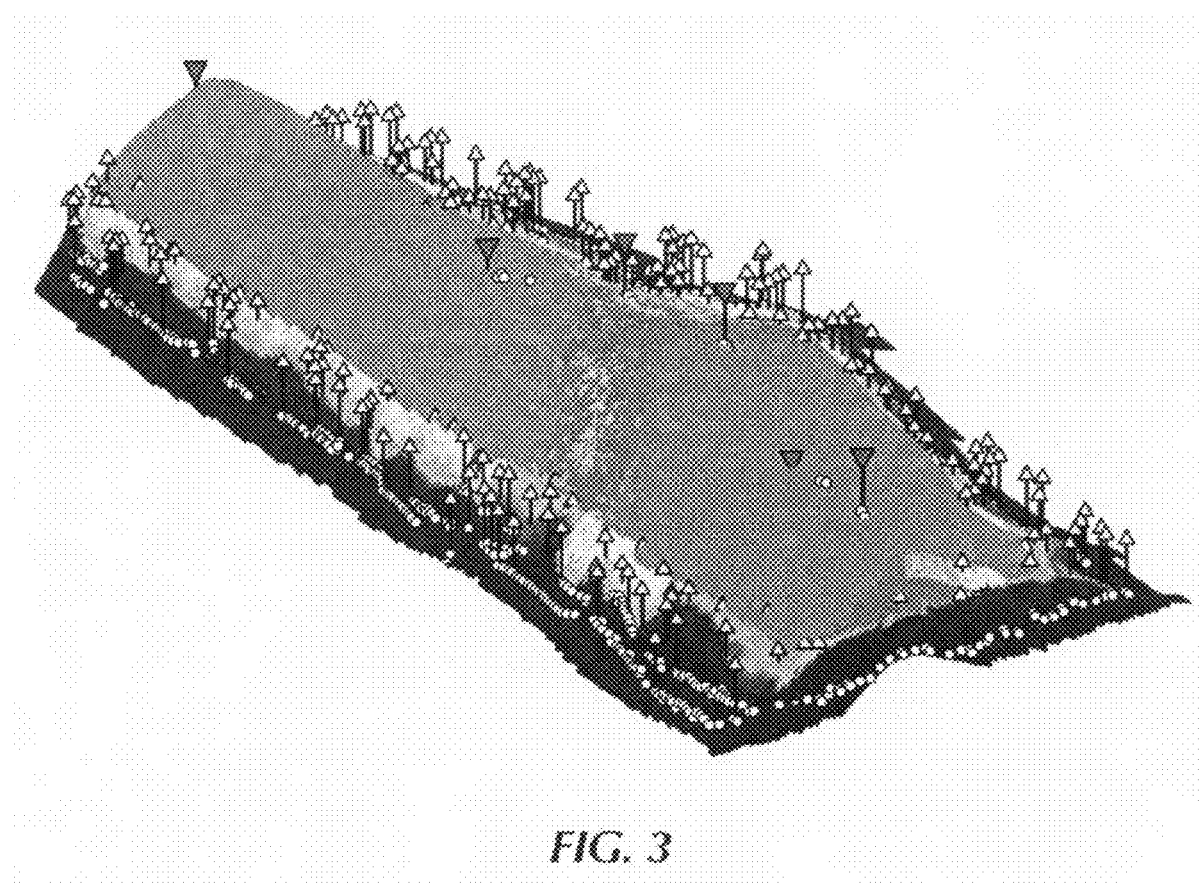
FIG. 3 is an isometric view of a subsurface hydrocarbon reservoir model obtained from processing well data according to the present invention.

A view of the projected fluid saturation in the AZIR field at around the middle of the year 2009 is shown in FIG. 3. The upward pointing arrowheads as exemplified at 32 indicate production wells and the downward pointing arrowheads as indicated at 34 are injection wells. The model of FIG. 3 contains about 1.4 million grid cells, as discussed above. Thus, due to the density of the grid, cell structure is not shown in FIG. 3. For data processing purposes gas production was allocated by appropriating 20 percent of produced gas for sales and 15 percent for fuel consumption, with the remaining 65 percent of the gas is re-injected (recycled) back into reservoir to maintain pressure.

For the historical time period (January, 1999 to December, 2004) of this hypothetical example, processing according to the present invention is not exercised as the reservoir performance is known. The simulation model is history matched (calibrated to the field performance) during this phase of the simulation study. Starting on the example future date of Jan.

1, 2005 the present invention processes the data and, based on the results obtained, predicts the future performance of the reservoir of FIG. 3 according to the production guidelines presented above (field potential maintenance, oil production target, facilities limits, etc).

During this forecast phase of the simulation, the schematic computational processes depicted in FIGS. 1 and 2 are carried out at appropriate time steps over the time interval of interest as the simulation in effect marches through time. The generalized constraint equation, Equation (1), is applied thousands of times at the group, well and completion levels for this relatively simple reservoir performance forecast scenario.

For the purposes of illustrating the application of this invention (WMS), the future performance of the AZIR field was predicted for a period of 30 years. This time period plus the history period of 6 years results in a 36 year simulation run. This run takes about 3 hours on the computer hardware configuration described earlier.

Figure 4:
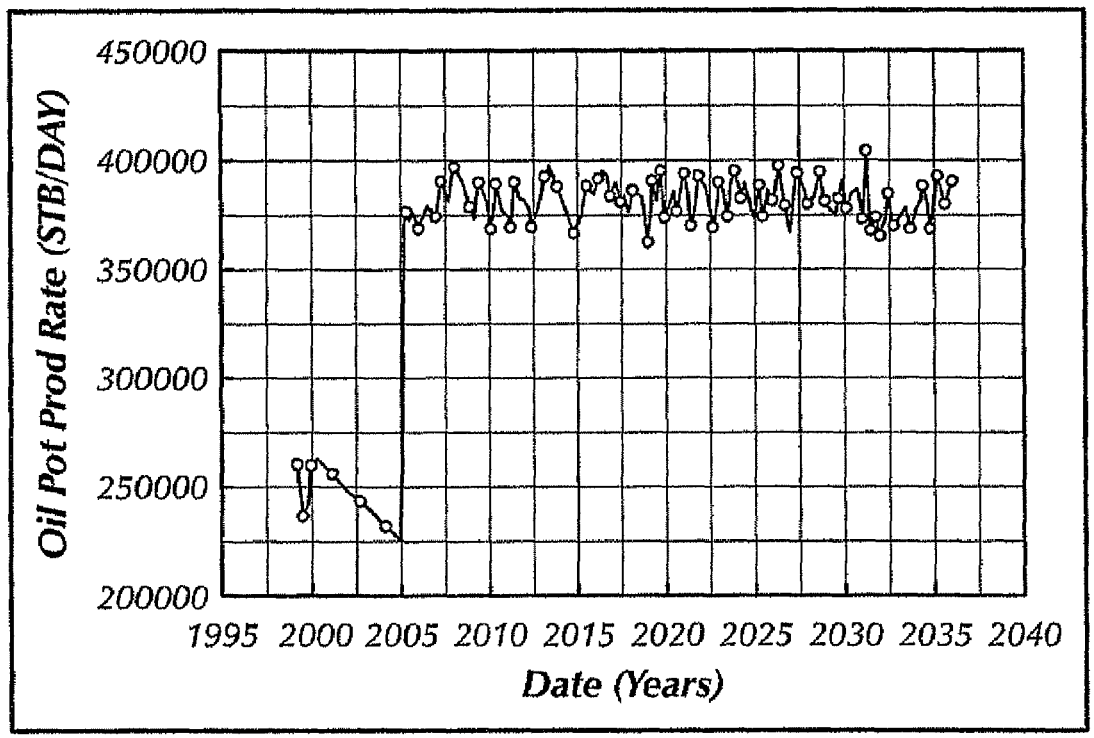
FIGS. 4, 5, 6 and 7 are plots of data processing results of future production obtained according to the present invention from data for the reservoir of FIG. 3.

The results from the simulation run are shown in FIGS. 4, 5, 6, & 7. The variation of the oil production potential as a function of time is shown in FIG. 4. As shown in the plot, the oil production potential for the 30 years of forecast, remains above the 360,000 barrels/day level. As the potential drops, the WMS drills new wells that belong to the different GOSPs and maintains the oil production potential.

Figure 5:
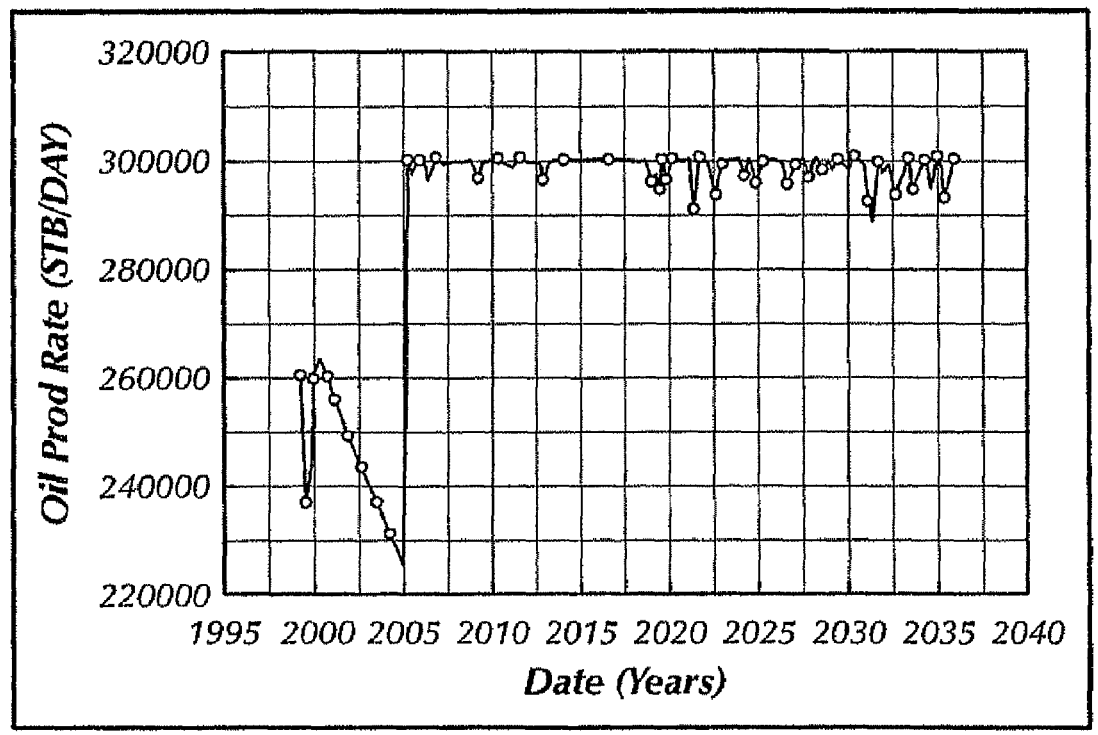

The field oil production as a function of time is shown in FIG. 5. In this figure it is noted that for the most part the production target rate of 300,000 barrels/day is met. Where the field rate temporarily falls below the target rate, some optimization is required of the MP well allocations to the 6 GOSPS. This is the first forecast run for this field. The field has the potential to meet the target rate as shown in FIG. 4.

Figure 6:
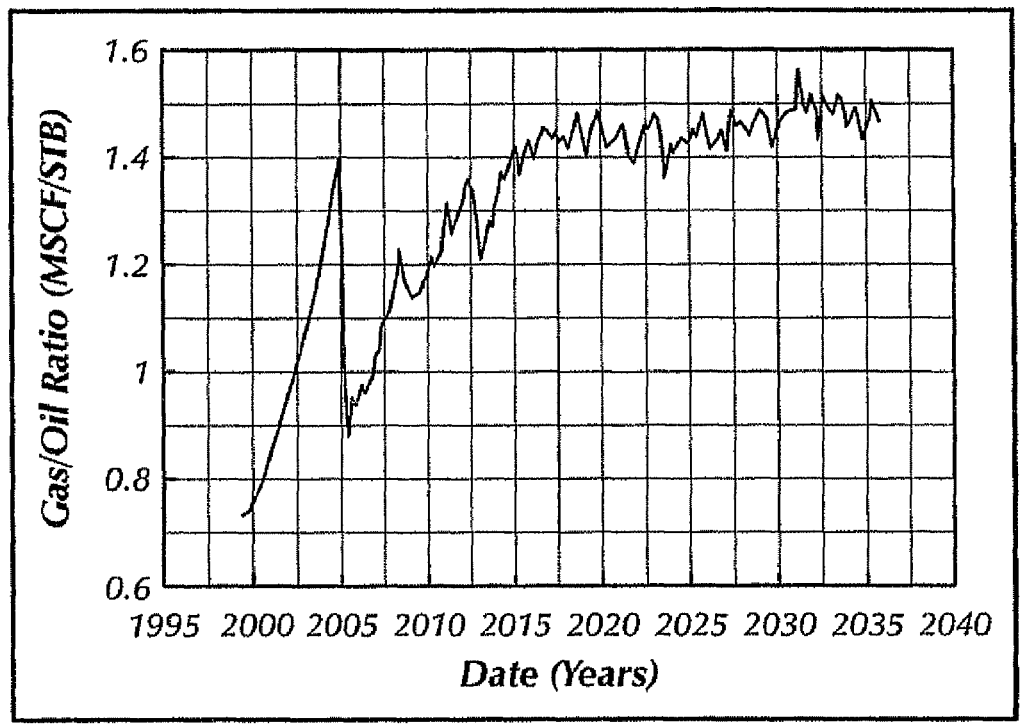

The produced field GOR as a function of time is shown below in FIG. 6. As shown in this figure, the present invention takes remedial actions to maintain the GOR at or below the limit 1500 SCF/Barrel (the units in the plot are in 1000 SCF/Barrel).

Figure 7:
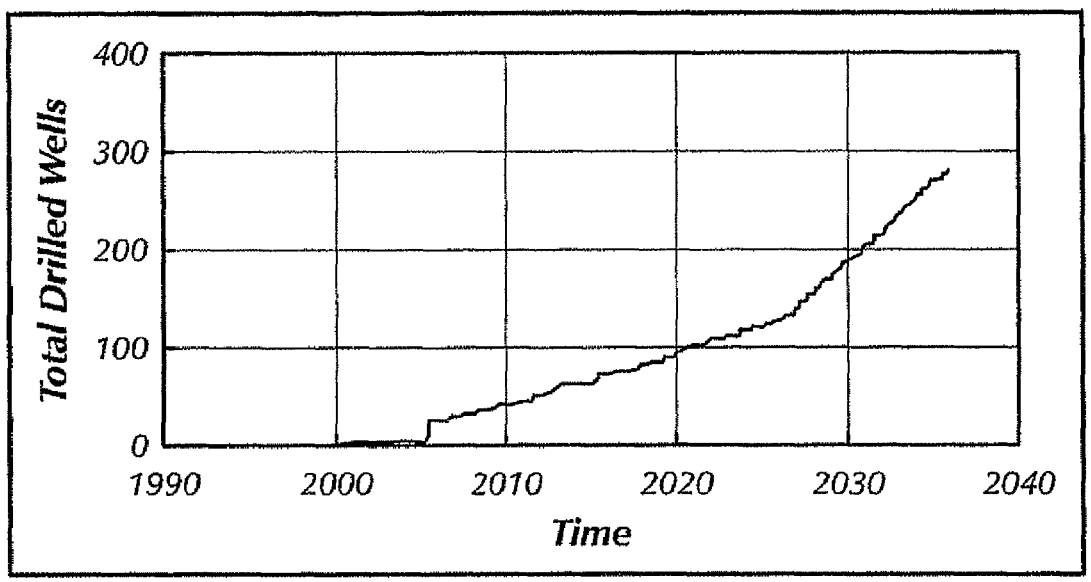

The total number of wells drilled as a function of time is presented in FIG. 7. At the beginning of year 2036, some 276 MP wells will have been drilled to maintain the field potential.

This invention has also been tested on several giant hydrocarbon reservoir field applications. Several examples are given below.

The first actual example is the Shaybah Field, a giant reservoir located in South-Eastern part of Saudi Arabia. The oil in the Shaybah reservoir is overlain by a huge gas cap that is the primary drive mechanism for oil recovery. The Shaybah reservoir has been on production since July 1998 and hence is in the early stages of its production life. After the historical performance of the reservoir from 1998 to 2000 was matched using a multi-million cell (3.5 million cells) model, the present invention was used to predict the performance for a period of 50 years (till 2050) for different facilities constraints (GOR limits) and production target rates. The present invention formulated that MP-wells were to be drilled in different GOSP areas as needed to maintain the target production rates while at the same time not exceeding the facilities constraints. The present invention reduced the run time for each simulation scenario by about half compared to previous approaches. The number of wells including MP-wells was around 850 over the 50 years of performance forecast for this study and almost all wells were long reach horizontal wells.

A second example is the Khurais Complex. This reservoir complex consists of several fields and when combined together it is one of the largest fields in Saudi Arabia. The historical performance of this reservoir complex from 1958 to the present time was matched using a four million cell model. The present invention was used to look at specific oil production rate targets subject to water facilities, handling limits and water injection limits and to sustain the target production rate for the longest period of time. The present invention predicted a plateau period of 24 years. The simulation run time was reduced by a factor of 2.5 compared to previous approaches. The number of wells including MP-wells was around 560 for this study.

A third example is the Ain Dar-Shedgum reservoir. This reservoir is part of the Ghawar system, which is the world's largest oil field and is located in the Eastern part of Saudi Arabia. This reservoir simulation study was undertaken to initially compare a 400,000 cell model with POWERS unmodified against result obtained with processing of the present invention, with the intent of building a fine grid multi-million cell model after the simulator results were compared with a commercial reservoir simulator. This reservoir model has one of the most complex well management calculations and serves to clearly demonstrate the performance and accuracy of the present invention. In this model there are over 3200 wells and over 140 well-groups. There is a 6 level nesting of groups and many local inter-group relationships such as produced water from a group of wells disposed into a group which contain water disposal wells. Wells are drilled as needed based on well priority specified by reservoir management to maintain a specified oil production target rate. This target is varied as a function of time. The prediction of the future performance of the reservoir by the present invention is in excellent agreement with the performance predicted by the more time consuming commercial simulator. However, the superiority of present invention is illustrated in the time taken to run the simulation. The present invention takes about 2 hours to complete the forecast scenario, while the commercial simulator takes over 1 day.

The present invention overcomes problems in prior work by using a mixed paradigm parallel processing technology (while also being amenable to single CPU technology) to develop the reservoir simulator with computation for the prediction of the recovery of oil and gas from the giant reservoirs. By using high resolution models, the reservoir is described much more accurately. In general the mixed paradigm parallel processing technology enables solution of larger problems faster.

With the present invention, generalized constraint equations are used to solve for the constraints that are violated. The generalized constraint equations are efficient and compact in that all possible constraints are considered at all times and hence do not require extensive software code branching that would be required in a prior art well management code. The generalized constraint equations are used at the reservoir, group, well and completion levels. Once the constraint equations are solved and the violations are identified at each level (for example, at the group level), appropriate remedial actions are taken at that level. This process is continued until all constraints for the entire reservoir have been checked and violations if any are acted upon.

With the generalized approach, the present invention can also handle regular black oil, extended black oil and Equation of State (EOS) based Compositional treatments of the reservoir hydrocarbon fluids.

The present invention is thus used to predict the future production of oil and gas from large hydrocarbon reservoirs and in all production phases of a hydrocarbon reservoir. In the early stages of reservoir development, the present invention can be used to predict the deliverability of oil and gas and help in estimating the number of wells to be drilled to maintain a specified production target and in the design of surface gathering facilities. In later stages, it is used to predict the length of time that a specified production rate can be sustained.

Figure 8:
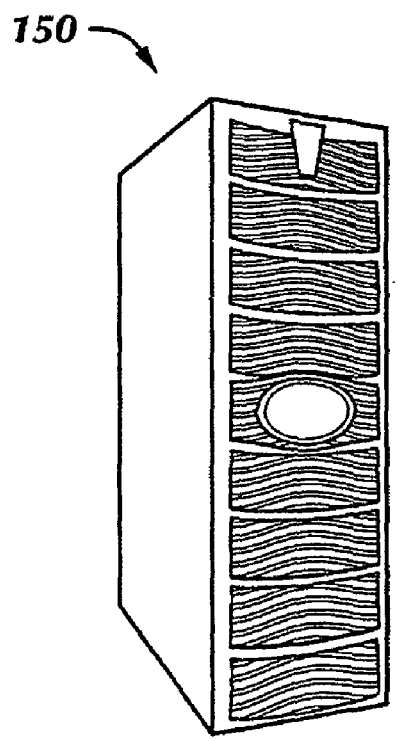
FIGS. 8, 9, 10 and 11 are schematic diagrams of various computer architectures for analyzing performance of a hydrocarbon reservoir according to the present invention.
Figure 9:
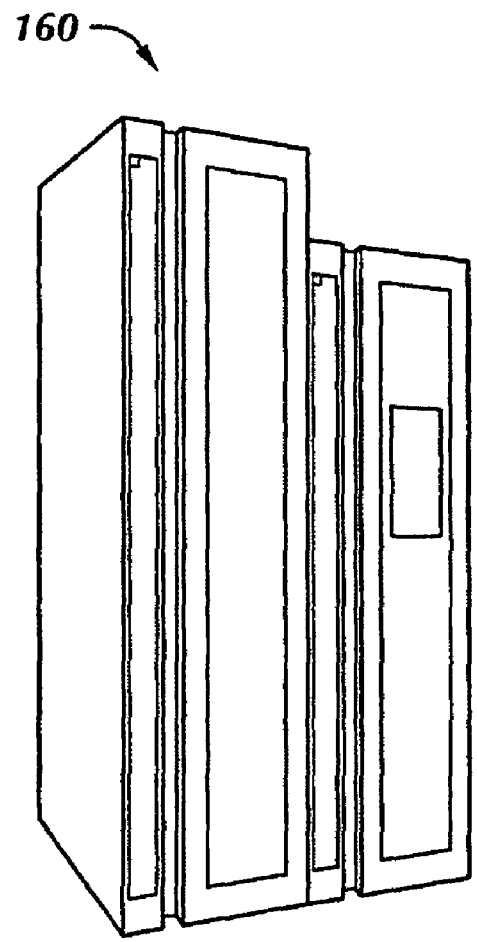
Figure 10:
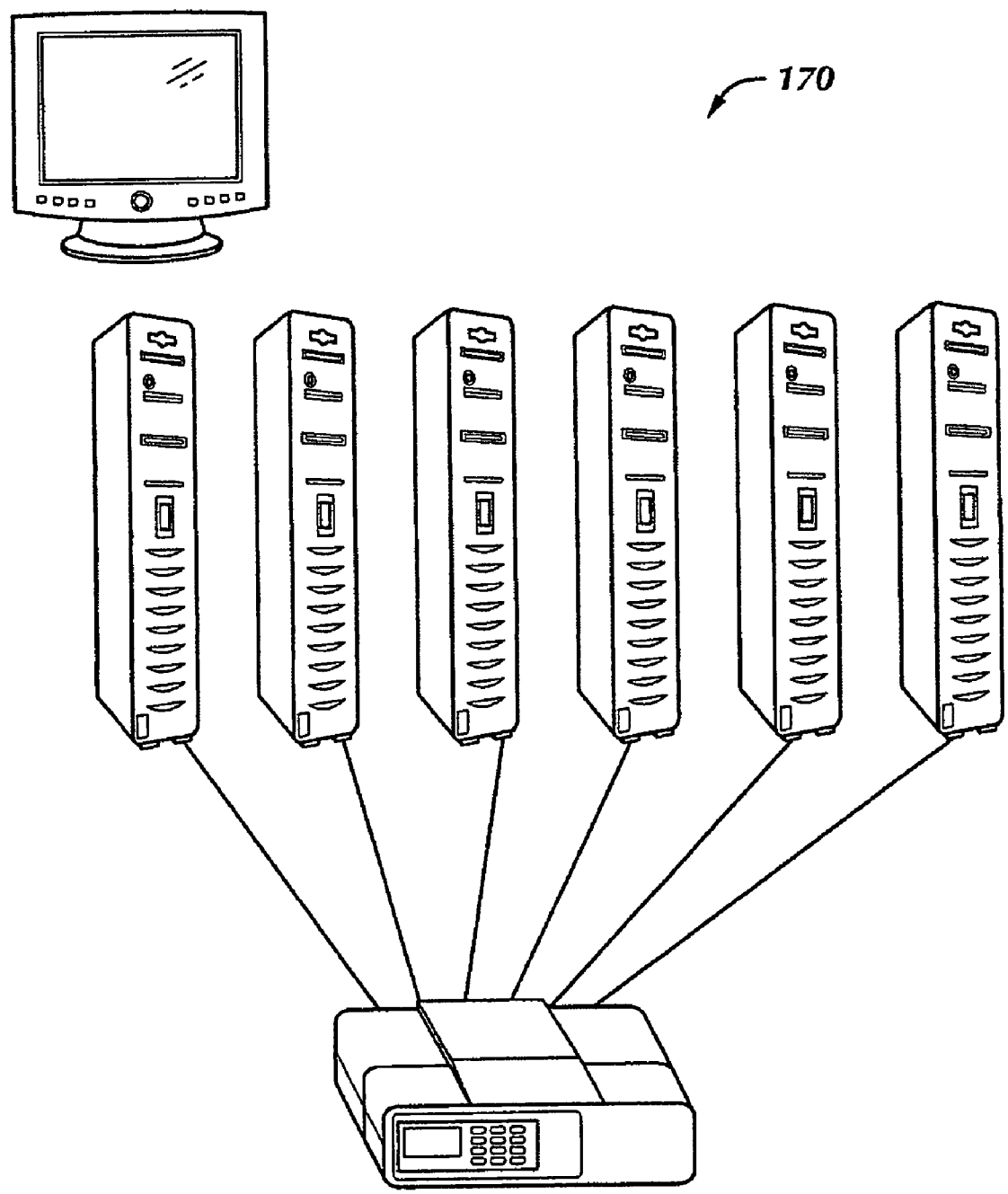
Figure 11:
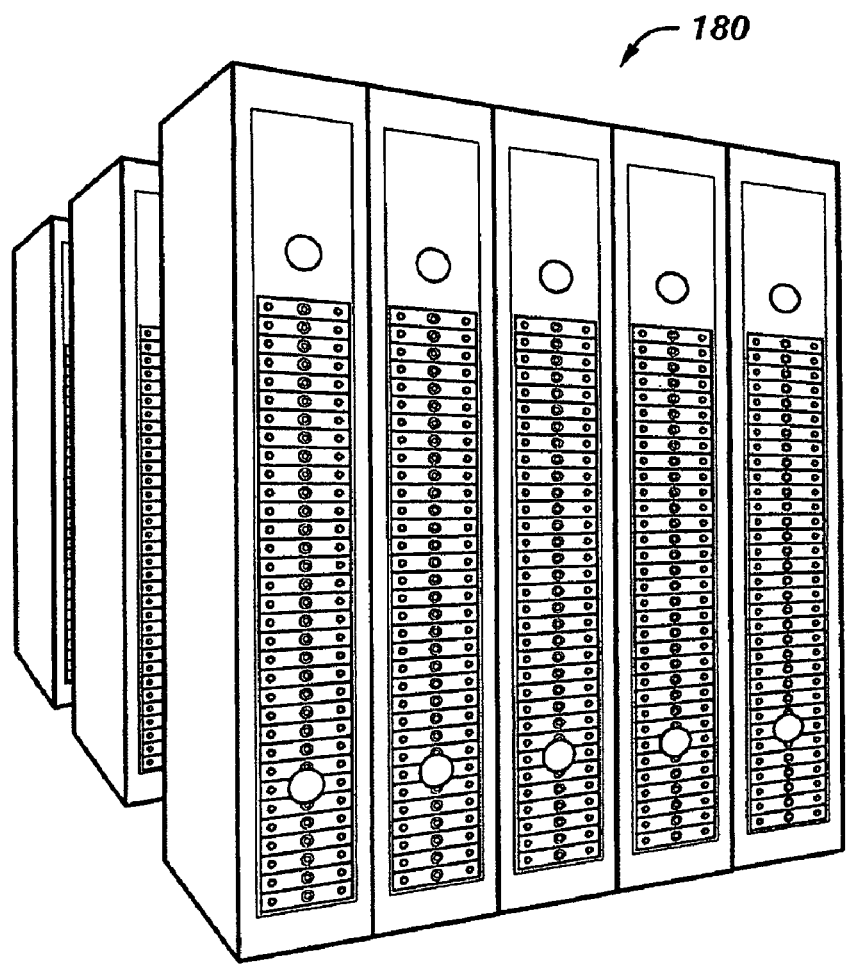
Figure 12:
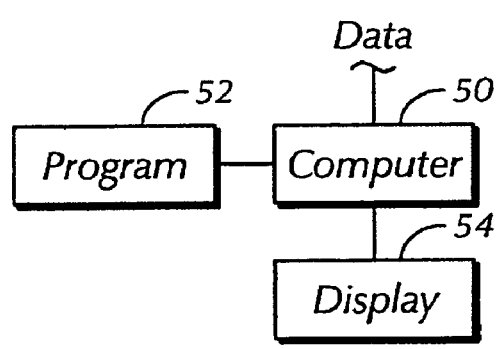
FIG. 12 is a functional block diagram of a computer and associated peripherals for analyzing performance of a hydrocarbon reservoir according to the present invention.

Although the present invention has been described as implemented in a massively parallel reservoir simulator, it can be implemented in other types of reservoir simulator. It can also be run on a variety of computer platforms, such as single CPU 50 (FIG. 12), a Shared Memory Parallel or Massively Parallel Processing computer 150 (FIG. 8), a distributed memory super-computer 160 (FIG. 9), a self-made PC cluster (FIG. 10), or a Production PC cluster 180 (FIG. 11).

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A computer-implemented method of analyzing performance of a producing giant hydrocarbon reservoir based on performance data obtained from the reservoir, for adjustment of production of hydrocarbon fluids from the reservoir, a method of analyzing production data from the reservoir, comprising the steps of;
   establishing in the computer a set of constraint values based on production constraints for objects in the reservoir;
   determining production results values for stream quantities produced by the objects in the reservoir based on performance data obtained from the reservoir;
   comparing in the computer the determined production result values for stream quantities produced for a first group of objects in the reservoir with the established set of constraint values based on production constraints for the first group of objects, the first group of objects being selected from wells and completions in wells in the reservoir;
   identifying in the computer, based upon the results of comparing for the first group, objects having determined production result values for stream quantities produced which violate at least one of the established set of constraint values;
   taking corrective action to adjust production performance of the identified objects of the first group so that further production from the identified objects of the first group conforms to the established constraint values;
   updating data in the computer based on the steps of taking corrective action for production performance of the identified objects of the first group of objects;
   comparing in the computer the determined production result values for stream quantities produced for a second group of objects in the reservoir with the established set of constraint values based on production constraints for the second group of objects, the second group of objects being selected from linked wells and linked groups of wells in the reservoir;
   identifying in the computer, based upon the results of comparing for the second group, objects having production result values for stream quantities produced which violate at least one of the established set of constraint values;
   taking corrective action to adjust for production performance of the identified objects of the second group so that further production from the objects of the second group conforms to the established production constraint values; and
   updating data in the computer based on the steps of taking corrective action for production performance of the identified objects of the second group of objects.

2. A data processing system for analyzing performance of a producing giant hydrocarbon reservoir, based on performance data obtained from the reservoir, for adjustment of production of hydrocarbon fluids from the reservoir, the data processing system including a computer comprising:
   a processor for performing the steps of:
   establishing in the computer a set of constraint values based on production constraints for objects in the reservoir;
   determining production results values for stream quantities produced by the objects in the reservoir based on performance data obtained from the reservoir;
   comparing in the computer the determined production result values for stream quantities produced for a first group of objects in the reservoir with the established set of constraint values based on production constraints for the first group of objects, the first group of objects being selected from wells and completions in wells in the reservoir;
   identifying in the computer, based upon the results of comparing for the first group, objects having determined production result values for stream quantities produced which violate at least one of the established set of constraint values;
   taking corrective action to adjust production performance of the identified objects of the first group so that further production from the identified objects of the first group conforms to the established constraint values;
   updating data in the computer based on the steps of taking corrective action for production performance of the identified objects of the first group of objects;
   comparing in the computer the determined production result values for stream quantities produced for a second group of objects in the reservoir with the established set of constraint values based on production constraints for the second group of objects, the second group of objects being selected from linked wells and linked groups of wells in the reservoir;
   identifying in the computer, based upon the results of comparing for the second group, object having production result values for stream quantities produced which violate at least one of the established set of constraint values;
   taking corrective action to adjust for production performance of the identified objects of the second group so that further production from the objects of the second group conforms to the established production constraint values; and
   updating data in the computer based on the steps of taking corrective action for production performance of the identified objects of the second group of objects.

3. A data storage device having stored therein instructions in machine-readable code for causing a data processor to analyze performance of a producing giant hydrocarbon reservoir, based on performance data obtained from the reservoir, for adjustment of production of hydrocarbon fluids from wells in the reservoir, the stored instructions in the data storage device causing the processor to perform the following steps:

establishing in the computer a set of constraint values based on production constraints for objects in the reservoir;

determining production results values for stream quantities produced by the objects in the comparing in the computer the determined production result values for stream quantities produced for a first group of objects in the reservoir with the established set of constraint values based on production constraints for the first group of objects, the first group of objects being selected from wells and completions in wells in the reservoir;

identifying in the computer, based upon the results of comparing for the first group, objects having determined production result values for stream quantities produced which violate at least one of the established set of constraint values;

taking corrective action to adjust production performance of the identified objects of the first group so that further production from the identified objects of the first group conforms to the established constraint values;

updating data in the computer based on the steps of taking corrective action for production performance of the identified objects of the first group of objects;

comparing in the computer the determined production result values for stream quantities produced for a second group of objects in the reservoir with the established set of constraint values based on production constraints for the second group of objects, the second group of objects being selected from linked wells and linked groups of wells in the reservoir;

identifying in the computer, based upon the results of comparing for the second group, objects having production result values for stream quantities produced which violate at least one of the established set of constraint values;

taking corrective action to adjust for production performance of the identified objects of the second group so that further production from the objects of the second group conforms to the established production constraint values; and updating data in the computer based on the steps of taking corrective action for production performance of the identified objects of the second group of objects, reservoir based on performance data obtained from the reservoir.

4. The computer-implemented method of claim 1, wherein the wells of the second group of objects in the reservoir include a plurality of groups of linked wells, the linked wells comprising a plurality of interrelated wells in the reservoir, and wherein at least one of the wells in the groups of linked wells is included in other groups of linked wells in the reservoir.

5. The computer-implemented method of claim 4, wherein fluid flow from individual ones of the wells in the well group is interrelated with fluid flow in other wells in the well group.

6. The computer-implemented method of claim 1, wherein the step of taking corrective action for production performance of the identified objects in the second group comprises:

modifying injection allocations; and adjusting production performance for the identified objects in the second group based on the modified injection allocations.

7. The computer-implemented method of claim 1, wherein the step of taking corrective action for production performance of the identified objects comprises:

determining formation voidage for formations in the reservoir; and adjusting production performance for the identified objects in the second group based on the determined formation voidage.

8. The computer-implemented method of claim 1, wherein the step of taking corrective action for production performance of the identified objects comprises:

determining formation fluid recycling for the reservoir; and adjusting production performance for the identified objects in the second group based on the determined formation fluid recycling.

9. The computer-implemented method of claim 1, wherein at least one gas/oil separation facility is connected to the producing reservoir, and wherein the specified production constraint comprises gas/oil separation capacity.

10. The computer-implemented method of claim 1, wherein the established set of production constraints includes gas/oil ratio for wells in the reservoir and the step of determining production result values for stream quantities includes determining the ratio of the flow rates of gas and oil for the wells and the step of adjusting scheduled performance comprises isolating wells based on the determined gas/oil ratio.

11. The computer-implemented method of claim 1, wherein the established set of production constraints includes gas/oil ratio for wells in the reservoir and the step of determining stream quantities includes determining the ratio of the flow rates of gas and oil for the wells, and the step of taking corrective action to adjust production performance of objects in the first group comprises shutting in wells based on the determined gas/oil ratio.

12. The computer-implemented method of claim 1, further including simulating the drilling of new wells.

13. The computer-implemented method of claim 1, further including maintaining gas/oil ratio for fluids produced from the reservoir.

14. A computer-implemented method of analyzing performance of a producing giant hydrocarbon reservoir, based on performance data obtained from production from the reservoir provided by a reservoir simulator computer, for adjustment of production of hydrocarbon fluids from the reservoir, comprising the steps of;

establishing in the computer a set of constraint values based on production constraints for objects in the reservoir;

determining production results values for stream quantities produced by the objects in the reservoir based on performance data obtained from the reservoir;

comparing in the computer the determined production result values for stream quantities produced for a first group of objects in the reservoir with the established set of constraint values based on production constraints for the first group of objects, the first group of objects being selected from wells and completions in wells in the reservoir;

identifying in the computer, based upon the results of comparing for the first group, objects having determined production result values for stream quantities produced which violate at least one of the established set of constraint values;

taking corrective action to adjust production performance of the identified objects of the first group so that further production from the identified objects of the first group conforms to the established constraint values;

updating data in the computer based on the steps of taking corrective action for production performance of the identified objects of the firs group of objects;

comparing in the computer the determined production result values for stream quantities produced for a second group of objects in the reservoir with the established set of constraint values based on production constraints for the second group of objects, the second group of objects being selected from linked wells and linked groups of wells in the reservoir;

identifying in the computer, based upon the results of comparing for the second group, objects having production result values for stream quantities produced which violate at least one of the established set of constraint values;

taking corrective action to adjust for production performance of the identified objects of the second group so that further production from the objects of the second group conforms to the established production constraint values; and updating data in the computer based on the steps of taking corrective action for production performance of the identified objects of the second group of objects.

15. A data processing system for analyzing performance of a producing giant hydrocarbon reservoir, based on performance data obtained from production from the reservoir provided by a reservoir simulator computer, for adjustment of production of hydrocarbon fluids from the reservoir, the data processing system comprising:

a processor for performing the steps of:

establishing in the computer a set of constraint values based on production constraints for objects in the reservoir;

determining production results values for stream quantities produced by the objects in the reservoir based on performance data obtained from the reservoir;

comparing in the computer the determined production result values for stream quantities produced for a first group of objects in the reservoir with the established set of constraint values based on production constraints for the first group of objects, the first group of objects being selected from wells and completions in wells in the reservoir;

identifying in the computer, based upon the results of comparing for the first group, objects having determined production result values for stream quantities produced which violate at least one of the established set of constraint values;

taking corrective action to adjust production performance of the identified objects of the first group so that further production from the identified objects of the first group conforms to the established constraint values;

updating data in the computer based on the steps of taking corrective action for production performance of the identified objects of the first group of objects;

comparing in the computer the determined production result values for stream quantities produced for a second group of objects in the reservoir with the established set of constraint values based on production constraints for the second group of objects, the second group of objects being selected from linked wells and linked groups of wells in the reservoir;

identifying in the computer, based upon the results of comparing for the second group, objects having production result values for stream quantities produced which violate at least one of the established set of constraint values;

taking corrective action to adjust for production performance of the identified objects of the second group so that further production from the objects of the second group conforms to the established production constraint values; and updating data in the computer based on the steps of taking corrective action for production performance of the identified objects of the second group of objects.

16. A data storage device having stored therein instructions in machine-readable code for causing a data processor to analyze performance of a producing giant hydrocarbon reservoir, based on performance data obtained from the reservoir, for adjustment of production of hydrocarbon fluids from wells in the reservoir, the stored instructions in the data storage device causing the processor to perform the following steps:

establishing in the computer a set of constraint values based on production constraints for objects in the reservoir;

determining production results values for stream quantities produced by the objects in the reservoir based on performance data obtained from the reservoir;

comparing in the computer the determined production result values for stream quantities produced for a first group of objects in the reservoir with the established set of constraint values based on production constraints for the first group of objects, the first group of objects being selected from wells and completions in wells in the reservoir;

identifying in the computer, based upon the result of comparing for the first group, objects having determined production result values for stream quantities produced which violate at least one of the established set of constraint values;

taking corrective action to adjust production performance of the identified objects of the first group so that further production from the identified objects of the first group conforms to the established constraint values;

updating data in the computer based on the steps of taking corrective action for production performance of the identified objects of the first group of objects;

comparing in the computer the determined production result values for stream quantities produced for a second group of objects in the reservoir with the established set of constraint values based production constraints for the second group of objects, the second group of objects being selected from linked wells and linked groups of wells in the reservoir;

identifying in the computer, based upon the results of comparing for the second group, objects having production result values for stream quantities produced which violate at least one of the established set of constraint values;

taking corrective action to adjust for production performance of the identified objects of the second group so that further production from the objects of the second group conforms to the established production constraint values; and updating data in the computer based on the steps of taking corrective action for production performance of the identified objects of the second group of objects.

* * * * *